US008345597B2

(12) United States Patent
Poisel

(10) Patent No.: US 8,345,597 B2
(45) Date of Patent: Jan. 1, 2013

(54) SYSTEMS AND METHODS FOR DETECTING SPREAD SPECTRUM SIGNALS IN AN AREA OF INTEREST

(75) Inventor: Richard A. Poisel, Vail, AZ (US)

(73) Assignee: Raytheon Company, Waltham, MA (US)

( * ) Notice: Subject to any disclaimer, the term of this patent is extended or adjusted under 35 U.S.C. 154(b) by 764 days.

(21) Appl. No.: 12/510,086

(22) Filed: Jul. 27, 2009

(65) Prior Publication Data

US 2011/0019611 A1 Jan. 27, 2011

(51) Int. Cl.
*H04W 4/00* (2009.01)
(52) U.S. Cl. ........ 370/328; 370/252; 375/141; 342/367; 455/456.1; 455/456.2
(58) Field of Classification Search .................. None
See application file for complete search history.

(56) References Cited

U.S. PATENT DOCUMENTS

| 2002/0101912 A1* | 8/2002 | Phelts et al. ................... 375/148 |
| 2005/0003831 A1* | 1/2005 | Anderson ................... 455/456.1 |
| 2008/0009295 A1* | 1/2008 | Brousseau et al. ......... 455/456.1 |
| 2008/0039039 A1* | 2/2008 | Chung et al. ............... 455/187.1 |
| 2008/0137524 A1* | 6/2008 | Anderson et al. ............. 370/203 |

OTHER PUBLICATIONS

Scholtz, Robert A. "The Origins of Spread-Spectrum Communications," IEEE Transactions on Communications, vol. Com-30, No. 5, pp. 822-854, May 1982.
Kim, Kwang Soon et al. "Analysis of Quasi-ML Multiuser Detection of DS/CDMA Systems in Asynchronous Channels," IEEE Transactions on Communications, vol. 47, No. 12, pp. 1875-1883, Dec. 1999.
Magill, D. Thomas et al. "Spread-Spectrum Technology for Commercial Applications," Invited Paper, Proceedings of the IEEE, vol. 82, No. 4, pp. 572-584, Apr. 1994.
Sarwate, Dilip V. et al. "Crosscorrelation Properties of Pseudorandom and Related Sequences," Invited Paper, Proceedings of the IEEE, vol. 68, No. 5, pp. 593-618, May 1980.
Pickholtz, Raymond L. et al. "Theory of Spread-Spectrum Communications—A Tutorial," IEEE Transactions on Communications, vol. Com-30, No. 5, pp. 855-884, May 1982.
Thomas, John K. et al. "The Probability of a Subspace Swap in the SVD," IEEE Transactions on Signal Processing, vol. 43, No. 3, pp. 730-736, Mar. 1995.
Digital Communications "5-1-1 Correlation Demodulator," Chapter 5: Optimum Receivers for the Additive White Gaussian Noise Channel, pp. 234-283.
Ditigal Communications "13-2-4 Generation of PN Sequences," Chapter 13: Spread Spectrum Signals for Digital Communications, pp. 724-729.
Cook, Charles E. et al. "An introduction to Spread Spectrum," IEEE Communications Magazine, pp. 8-16, Mar. 1983.

* cited by examiner

*Primary Examiner* — Phirin Sam
*Assistant Examiner* — Nicholas Sloms
(74) *Attorney, Agent, or Firm* — Schwegman, Lundberg & Woessner, P.A.; Gregory J. Gorrie

(57) ABSTRACT

Systems and methods are provided for detecting and geo-locating a target transmitting a CDMA or other spread-spectrum signal within an area of interest. Targets are identified by spatially-dividing the area of interest into a number of cells. First and second receiving beams are sequentially directed toward each of the cells from two or more different intercept sites. The presence of the spread-spectrum signal within each cell is identified from the signals received at each directional beam, and if the spread-spectrum signal is present in both the first and the second receiving beams, then the target can be indicated to be present within the cell.

18 Claims, 4 Drawing Sheets

SYSTEMS AND METHODS FOR DETECTING SPREAD SPECTRUM SIGNALS IN AN AREA OF INTEREST

TECHNICAL FIELD

The following discussion generally relates to detection of spread spectrum signals within an area of interest.

BACKGROUND

Direct sequence spread spectrum (DSSS) technologies allow the energy of a broadcast signal to be spread across a relatively wide frequency range through application of a digital code. DSSS technologies are widely used in modern wireless communications. Many conventional cellular phones, for example, make use of code division multiple access (CDMA) technologies that allow multiple transceivers to share a common channel through the use of unique digital codes applied to communications sent and received by each transceiver.

Spread spectrum signals frequently resemble noise signals in that they have a relatively large number of different frequency components, each with relatively low power. DSSS signals can be very difficult to identify in a received signal, then, because DSSS signal components tend to resemble the background noise. Receivers that have access to the digital code used to modulate a broadcast signal, however, can readily recreate the transmitted message using the code. If the receiver does not have access to the spreading code, it can be extraordinarily difficult to receive the broadcast message, or even to identify that a signal is present in the background noise, especially when the particular spreading code used to modulate the DSSS signal is unknown to the detecting party.

Detecting and locating a particular CDMA or other DSSS signal within an area, then, can be relatively difficult, particularly when the spreading code associated with the signal is not known. Because CDMA signals are typically spread across multiple frequencies and transmitted at the same time and within the same portion of the RF spectrum as other DSSS signals, conventional time and frequency-based de-multiplexing techniques can be of little use in isolating and identifying such signals.

Despite these challenges, interest nevertheless remains in identifying and/or geolocating DSSS transmissions within a geographic region or area. It is therefore desirable to create systems and techniques for detecting and/or locating DSSS transmitters. It would be further desirable that such systems and techniques be able to identify DSSS transmitters without a priori knowledge of the spreading code used by the transmitter. These and other desirable features and characteristics will become apparent from the subsequent detailed description and the appended claims, taken in conjunction with the accompanying drawings and this background section.

BRIEF DESCRIPTION

Various systems, devices and methods are provided for detecting and geo-locating a target transmitting a CDMA or other spread-spectrum signal within an area of interest. Targets are identified by spatially-demodulating the area of interest into a number of cells. First and second receiving beams are sequentially directed toward each of the cells from two or more different intercept sites. The presence of the spread-spectrum signal within each cell is identified from the signals received at each directional beam, and if the spread-spectrum signal is present in both the first and the second receiving beams, then the target can be indicated to be present within the cell. The spread spectrum signal can be identified within the received beam according to any of various techniques. Second order variations in an autocorrelation or other function associated with the received signal, for example, can readily identify the presence of a recurring pattern (e.g., a DSSS code) in a received signal, even if the actual code is not previously known to the receiver.

In various exemplary embodiments, a system of detecting a target located within an area of interest and transmitting a spread spectrum signal is provided. The system comprises a first intercept receiver configured to provide a first receiving beam that is oriented toward a selected portion of the area of interest, a second intercept receiver configured to provide a second receiving beam oriented toward the selected portion of the area of interest, and a central control. The central control is configured to direct the first and second intercept receivers to thereby coordinate the simultaneous orientation of the first and second receiving beams toward the selected portion of the area of interest, and to indicate that the target is located in the selected portion of the area of interest if the first and the second receiving beams both indicate the presence of the spread spectrum signal.

Other embodiments provide a system for detecting a target located within an area of interest and transmitting a spread-spectrum signal. The system comprises a first intercept receiver or other means for sequentially directing a first receiving beam from a first intercept site at a first location toward each of a plurality of cells located within the area of interest. The system also comprises a second intercept receiver or other means for simultaneously directing a second receiving beam from a second intercept site toward each of the plurality of cells such that the first and second receiving beams are simultaneously directed toward the same cells, wherein the second intercept site is located at a second location different from the first location. The system further comprises a central control or other means for determining if the spread-spectrum signal is present in each of the first and the second receiving beams, and for indicating that the target is located within the one of the plurality of cells if the spread-spectrum signal is present in both of the first and the second receiving beams.

Still other embodiments provide a method for detecting a target located within an area of interest and transmitting a spread-spectrum signal. The method comprises, for each of a plurality of cells in the area of interest, directing a first receiving beam from a first intercept site located at a first location toward one of the plurality of cells. A second receiving beam is simultaneously directed from a second intercept site toward the same one of the plurality of cells, wherein the second intercept site is located at a second location different from the first location. It is determined if the spread-spectrum signal is present in each of the first and the second receiving beams, and, if the spread-spectrum signal is present in both of the first and the second receiving beams, the target is indicated to be located within the one of the plurality of cells.

Various other exemplary embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and:

DETAILED DESCRIPTION

Figure 1:
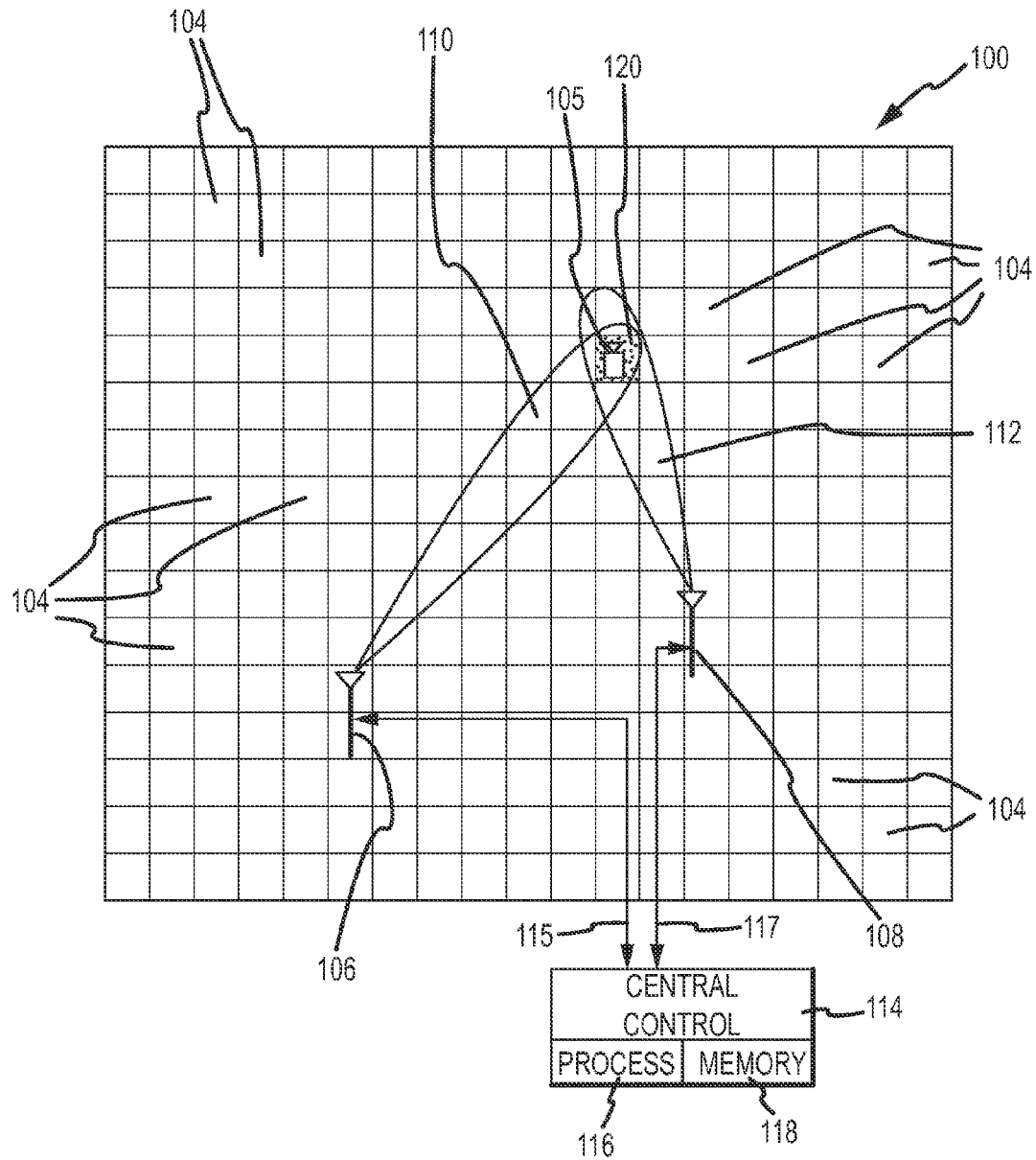
FIG. 1 is an exemplary diagram of an exemplary system that could be used to detect a target located within a cell of interest.

The following detailed description is merely exemplary in nature and is not intended to limit the invention or the application and uses of the invention. Furthermore, there is no intention to be bound by any theory presented in the preceding background or the following detailed description.

Various embodiments detect code division multiple access (CDMA) or other direct sequence spread spectrum (DSSS) signals transmitted within an area of interest by spatially modulating radio frequency signals received across various portions of the area. The area of interest is divided into any number of smaller cells of interest. Each cell represents a geographic portion of the total area that can be individually analyzed to identify DSSS signals emanating from that cell.

To detect targets present in each cell, two or more receiving beams are steered toward the cell of interest to receive any RF signals emanating from the cell. If the target is producing any spread spectrum broadcasts, the spread spectrum components are appropriately identified within the signals received at each beam. Signals may be detected, for example, by identifying relatively large second order variations in an autocorrelation or other function associated with the received signal at regular intervals. These second order variations can identify the presence of a repeating code (e.g., a spreading code) within the received signal, even if the particular code used to spread the particular transmission is unknown. If multiple beams identify the presence of spread spectrum content within a cell of interest, then a target can be identified within the cell. Additional processing may be used to avoid false positives, to detect co-channel interference, or to otherwise improve the reliability and usefulness of the detection system.

Generally speaking, blind geolocation can be performed using only limited information about the target. For CDMA signals, for example, a detector may know the phase shift keying (PSK) parameters for the CDMA cell, as well as the chip (symbol) lengths and data rates used in the CDMA cell. While the receiver may not have access to the baseband data or the spreading code used to modulate the data, this information may not be needed if the goal is simply to identify the presence of a transmitter within an area or to geo-locate the transmitter, without necessarily intercepting the underlying message itself. Geo-location may be useful, for example, to precisely locate a phone that is making an emergency call, particularly if the caller is unable to speak or otherwise provide such information. Location identification may also be useful in battlefield, homeland security or law enforcement situations, where it may be desirable to locate a person who is carrying a wireless phone. In still other embodiments, it may be desirable to locate a wireless phone or other transmitter associated with a weapon, explosive device or other inanimate object. Locating CDMA or other DSSS transmitters may therefore provide numerous benefits, including benefits in addition to those listed above.

Turning now to the drawing figures and with initial reference to FIG. 1, a target 105 is identified within an area of interest 100 by sequentially directing any number of receiving beams exemplified by 110, 112 toward any number of cells of interest 104. Each beam 110, 112 is associated with an intercept receiver 106, 108 (respectively) that is located in or near the area of interest 100, with each receiver 106, 108 being located in a different position from the other receiver(s). Directional beams 110, 112 are simultaneously or otherwise synchronously directed toward a target cell 120 to receive radio frequency (RF) signals emanating from the cell 120. If a target 105 is located within the target cell 120, both receivers 106, 108 should identify the presence of spread spectrum content within received beams 110, 112 (respectively). If only one receiver 106, 108 identifies spread spectrum signals in the direction of the target cell 120, then an intervening target may be identified, but it can generally be concluded that no target 105 is present within target cell 120. By sequentially directing the beams 110, 112 toward each of the various cells 104 making up the area of interest 100, all of the targets 105 present within the area can be identified.

Area of interest (AOI) 100 is any region or other space where DSSS transmitters, receivers or transceivers may be present. AOI 100 may represent a particular geographical area (e.g., a city, a portion of a city, a battlefield area, a campus or other property, or any other geographic region). Alternatively, AOI 100 may represent a telephony cell or other logical region wherein wireless telephones or other radios operate. A conventional CDMA (IS95) cell, for example, can typically support simultaneous operation of about sixty radio handsets, whereas a CDMA2k implementation can support over one hundred handsets within a single AOI. In some embodiments, AOI 100 may represent a logical wireless "cell", such as an IS95 or CDMA2k cell.

AOI 100 is logically divided into any number of cells of interest (COIs) 104. In the exemplary embodiment of FIG. 1, AOI 100 is shown to be generally rectangular, with a 19×16 grid of equally-sized square COIs 104 arranged in a regular, contiguous fashion. Other embodiments, however, may use areas 100 and cells 104 of any shape or size. Further, cells 104 need not be contiguous in all embodiments; "blind zones" or other areas with little or no coverage may be present in some embodiments. The size of the various cells 104 may be somewhat dependent upon the resolution of the beams 110, 112 that can be formed; that is, it may be desirable that the cells 104 by approximately sized to correspond with the widths of the beams directed toward the target cell 120. To that end, the various cells 104 may be differently-sized from each other in some embodiments to reflect the wider beams 110, 112 that may be present at greater distances from the intercept sites 106, 108.

Generally speaking, the size and number of cells 104 will affect the resolution of the geo-location, as well as the time to scan the entire area 100 and to process the results. That is, larger cell sizes will result in fewer cells 104 to cover an equivalent area 100, thereby reducing the resolution needed for beams 110, 112, as well as the amount of computing resources needed to process the signals received from each cell and the time to process the entire area. In an exemplary embodiment that covers a square kilometer area 100, for example, a ten square meter cell size would result in 10,000 cells 104. If processing each cell took 1 ms (for example), the entire area 100 could be analyzed in approximately 10 seconds. Such a small cell size, however, would typically use a beam resolution of about 0.6 degrees, which may be very difficult to implement in practice. Using a larger 37 square meter cell size, however, would allow 841 cells to cover the square kilometer area 100, with about 2 degree beam resolution. Moreover, the smaller cell size would result in more cells within the paths of each beam 110, 112, thereby increasing the probability of an interfering target 105 being detected. Issues relating to interfering targets 105 and false positive detection are discussed more fully below. The particular numerical values used in this paragraph are for illustration purposes only, and are not intended to limit any practical implementations.

Each intercept site 106, 108 includes any sort of antenna (or array of antennas) and a radio receiver capable of receiving an RF signal from the target cell 120. Intercept sites may be stationary or mobile; in some embodiments, intercept sites 106 and/or 108 may be mounted to a vehicle or other portable structure for improved mobility and flexibility. Both stationary and mobile intercept sites may be used concurrently in some embodiments. Although FIG. 1 shows only two intercept sites 106, 108, other embodiments may use any number of additional intercept sites to improve accuracy, resolution or other performance parameters. Some military embodiments, for example, may use only two intercept sites 106, 108, while others may use from three to five (or even more) intercept sites. The intercept sites 106, 108 are each located at different positions within area 100; intercept sites may also be located outside of the area 100, but within signal-receiving range of area 100 as desired.

In various embodiments, beams 110, 112 are formed and oriented toward the target cell 120 using conventional beamforming techniques. Such techniques may be used to "steer" an antenna's reception in a particular direction by reducing or eliminating interference from undesired sources. A conventional "delay and multiply" beamformer, for example, generally compensates each of the signals received from each of the antennas in an antenna array using a series of complex weights to extract a signal received in a particular direction. Other beamforming techniques include the standard Capon beamformer (SCB), the robust Capon beamformer (RCB), MUSIC beamforming and/or the like. Any number of other techniques could be used in other embodiments. Note that, while many Capon beamformers may conventionally require a replica of the received signal for ideal operation, this may not be necessary for simple geo-location (as opposed to full demodulation) of DSSS signals. By estimating signal values with an autocorrelation matrix or the like (which generally includes both signal and noise components), the need for this replica signal may be reduced or eliminated. Using conventional techniques that are currently available, an antenna array of about three meters in length can readily produce beams 110, 112 with resolutions of five degrees or so, although any beamforming techniques and resolutions could be used with antennas and antenna arrays of any sort and size, including any beamforming techniques that are presently known or subsequently developed.

The beams 110, 112 from each of the intercept sites therefore receive RF signals from the direction of a target cell 120 as desired. If spread spectrum components are present in the signals received by the directional beam, then a target 105 can be identified in the direction of the beam. If both beams 110, 112 indicate the presence of spread spectrum components, then the target 105 may be identified (at least in most cases) to be present at the intersection point of the two beams 110, 112. By directing the beams to intersect at each of the cells 104 in area 100, then, the presence or absence of target transmitters 105 can be identified.

Beams 110, 112 may be directed in any manner, and results processed in any manner. In various embodiments, a central control facility 114 communicates with each of the intercept sites 106, 108 (e.g., via signals 115, 117 respectively) to direct beams 110, 112 and/or to receive signal data obtained by the beams. In some embodiments, central control facility 114 is a control center with conventional data processing resources, including any sort of computing device with a processor 116 and memory 118. Central control 114 may be physically located at or near any of the intercept sites in some embodiments. In other embodiments, central control may be remotely located from area 100. Signals 115, 117 may be transmitted over any sort of wired, wireless, network, satellite or other data connection to allow for control of the target location process from any convenient location.

Figure 2:
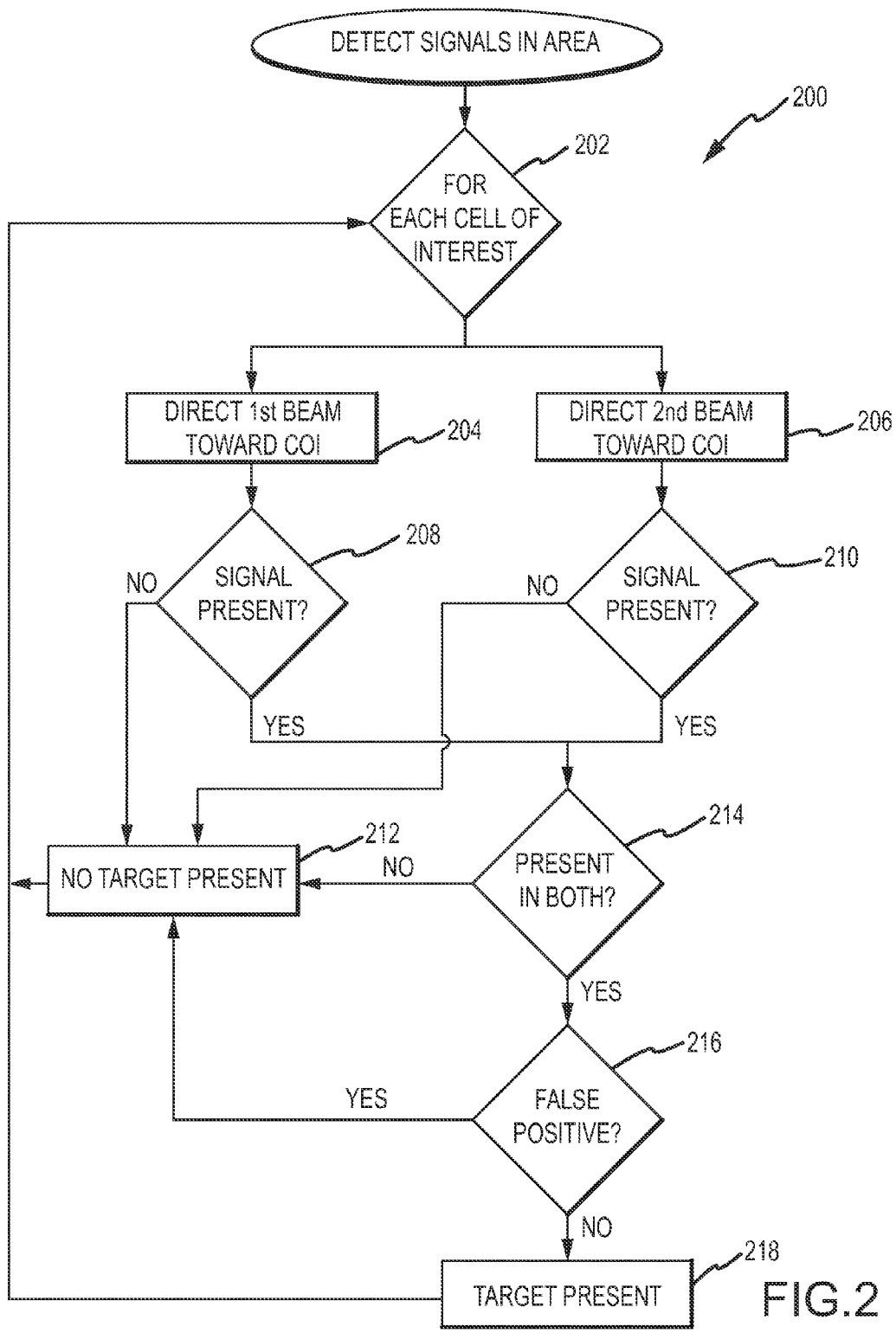
FIG. 2 is a flowchart of an exemplary process for locating targets within an area of interest.

FIG. 2 shows an exemplary process 200 for processing sample data that is consistent with the above concepts. Generally speaking, process 200 includes the broad steps of, for each cell 104 in the area of interest 100, directing first and second beams toward the target cell 105 (functions 204, 206). If spread spectrum signals are present (functions 208, 210) in both beams (function 214), then the target can be identified (function 218). Various other features of certain exemplary embodiments are also shown within FIG. 2, as described more fully below.

As noted above, any number of cells of interest 104 may be analyzed to determine if targets 105 are present (function 202). In various embodiments, each of the COIs 104 within the AOI 100 are sequentially processed. That is, beams 110, 112 (and any additional beams) may be sequentially directed toward the each of the cells 104 in any orderly fashion. Process 200 may be repeated as desired to accommodate any number of cells 104, at any at any periodic or aperiodic time interval as desired.

For each target cell 105 located in area 100, two or more receiving beams are directed toward the target cell 120 to determine if spread spectrum signal components are present in the direction of the target cell 120 (functions 204, 206). Steering the beams in this manner may involve, for example, creating directional receiving beams 110, 112 using any of the beamforming techniques described above. In some embodiments, the two beams 110, 112 are precisely synchronized so that the two beams are directed at the target cell 120 at the same time. This may be accomplished by, for example, providing an instruction from central control 114 to each of the intercept sites 106, 108 that instructs the intercept cites 106, 108 to direct their beams 110, 112 toward the particular target cell 120. In other embodiments, each intercept site 106, 108 sequentially directs the beam 110, 112 toward the target cell 120 according to a pre-determined pattern or scheme, which may be time-coordinated to any reference as desired. The beams may be synchronized (using, for example, a time reference obtained from the CDMA network, from the global positioning system (GPS), or from any other source), although precise synchronization may not necessarily be required in all embodiments. Hence the actual means used to direct the beams may refer to logic at central control 114 that generates instructions 115, 117 to the intercept sites 106, 108. In other embodiments, the means for directing the beams may refer to the antenna arrays and associated control logic used at the intercept sites 106, 108 to form and direct the receiving beams 110, 112 themselves.

Spread spectrum signals may be identified within the RF signals received by the first and second beams 110, 112 in any manner (functions 208, 210). In various embodiments, signal processing logic present at the intercept site 106, 108 and/or at the central control 114 is used to determine if spread spectrum components are present within the receive signals. Any number of signal processing techniques could be used to identify the presence of spread spectrum components. Second order characteristics of the received signal, for example, could be monitored and compared to threshold values to identify excessive variability at certain time intervals corresponding to multiples of the DSSS code sequence applied to the received data. One technique that uses autocorrelation of a time-delayed signal is described below in conjunction with FIG. 3, although other embodiments may use any number of other techniques, including techniques currently known or subsequently developed. This signal processing may be performed at the intercept site in some embodiments; other embodiments may allow partial or complete processing of received signals at the central control 114. The particular means for determining if spread spectrum components are present within the received signals, then, could refer to processing hardware (e.g., a conventional microcontroller or microprocessor-based system) located at the intercept site 106, 108. In other embodiments, the means for determining if the spread spectrum components are present could be logic at central control 114, such as logic executing within processor 116. In some embodiments, logic at the intercept site determines the presence or absence of spread-spectrum components and indicates this presence or absence to the central control 114.

If both beams 110, 112 indicate the presence of spread spectrum components (function 214), then a target 105 may be indicated to be present within the target cell 120 (function 218). Otherwise, no target 105 is generally considered to be present within the target cell 120 (function 212). If one beam identifies a spread spectrum signal but the other does not, the signal can generally be deduced to be emanating from a target 105 that is located on the line between the intercept site and the target cell 120, but not necessarily within the target cell. Note that spread spectrum signals may be identified if the target 105 is beyond the target cell 120, as well as between the target cell 105 and the intercept site. To determine if both beams contain spread spectrum components, results of the determination functions 208, 210 may be provided to a common processor. If determinations 208, 210 are performed at the intercept sites 106, 108, for example, at least one site 106, 108 will provide information about the determination to the other intercept site 106, 108 and/or to central control 114 to facilitate processing of both signals. Determination of target 105 presence or absence within target cell 120 may be performed, then, at central control 114 (e.g., by logic executing within processor 116), at one or more intercept sites 106, 108, and/or at any other location as desired.

In some embodiments, further processing is performed to improve the accuracy of results obtained. False positive results, for example, may be identified in some embodiments (function 216) by comparing the received signals from the two beams 110, 112 to ensure that the two spread spectrum components identified in the two beams originate from the same target 105 source. This would assist in reducing errors caused, for example, if interfering targets 105 happened to be located along the paths of both beams 110 and 112, but not within the particular target cell 120. Additional discussion of false positive resolution is described below in conjunction with FIG. 4, although other embodiments may use any other presently known or subsequently developed techniques.

Generally speaking, each of the various steps in process 200 may be performed by signal processing or other hardware, firmware or software executing in any computing environment. In an exemplary embodiment, process 200 is directed by software instructions that are associated with central control 114, which may operate alone or in conjunction with intercept sites 115 and/or 117. Software instructions for directing process 200 may be stored in memory 118 or in any other storage associated with central control 114, for example, for execution on any processor 116. In addition to the particular means described above, other embodiments may be implemented in dedicated processing hardware, firmware and/or other means as desired.

Figure 3:
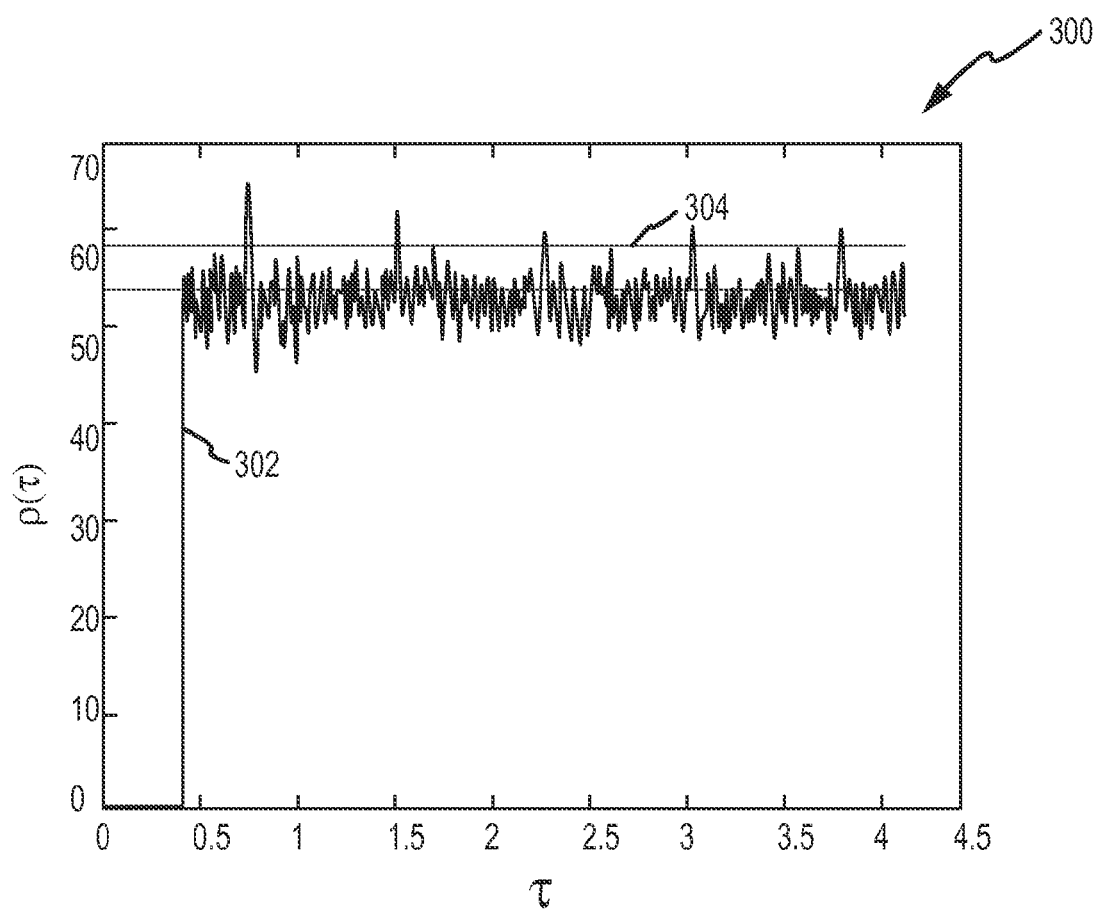
FIG. 3 is a plot of an exemplary autocorrelation function for a received signal as a function of correlation delay ($\tau$)
Figure 4A:
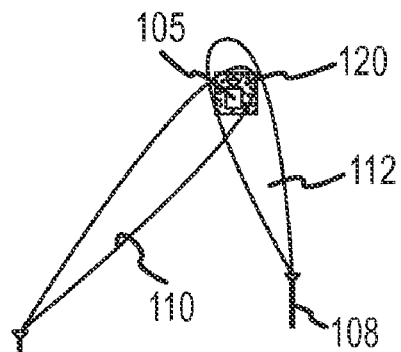
FIG. 4 is a diagram showing several exemplary scenarios (a)-(e) that may be considered in detecting false positive situations.
Figure 4B:
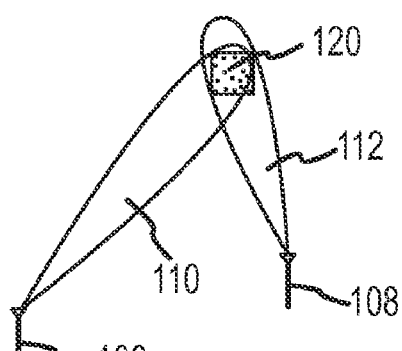
Figure 4C:
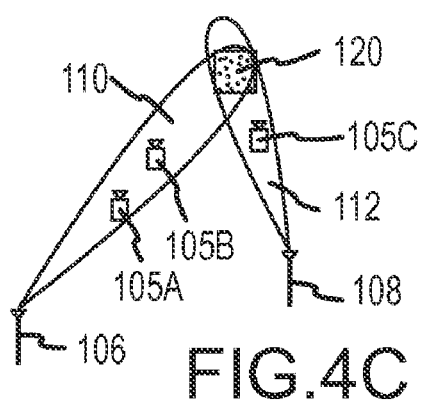
Figure 4D:
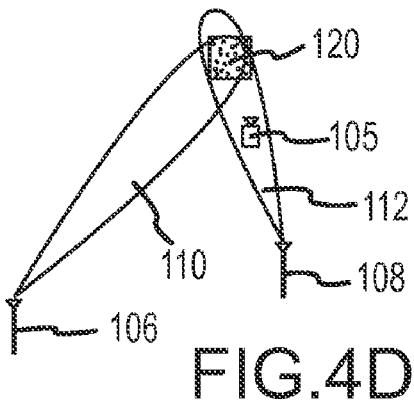
Figure 4E:
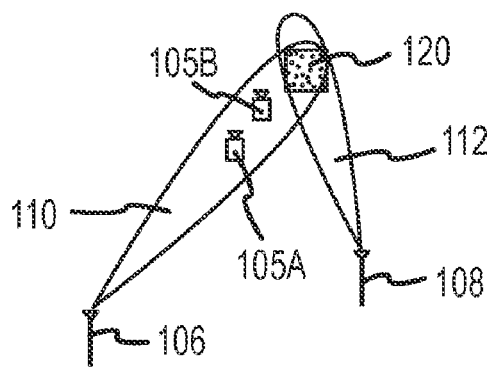

FIG. 3 shows an exemplary plot 300 showing second order fluctuations of an autocorrelation function 302 for various values of applied delay ($\tau$). As can be seen from FIG. 3, the second order fluctuations 302 produce peaks that exceed a threshold value 304 at regular intervals corresponding to the code length of the spread spectrum code. This is because the repeating code produces repeatable effects that are amplified when the autocorrelation function reflects a delay that corresponds to the code period of the code sequence. Stated another way, when the repeating codes of the DSSS signal are properly autocorrelated with each other, they stand out in a more dramatic way that can be readily detected. Although the receiver may not know the particular code that is used and may not be able to decode the underlying message, the receiver may nevertheless identify that spread spectrum signals are present within the received signal. This feature can be used even when the power of the DSSS signal is below the noise threshold due to the virtual amplification provided by the autocorrelation function. Hence, CDMA and other signals can be readily identified within the received beams 110, 112.

Function 302 may be computed in any manner. In various embodiments, an autocorrelation function $r(\tau)$ of the received signal $y(t)$ is computed as follows:

$$\hat{r}_{yy}^{(m)}(\tau) = \frac{1}{T} \int_0^T y(t)y(t+\tau)dt \qquad (1)$$

The second order fluctuations can be computed from the autocorrelation as follows:

$$\rho(\tau) = \frac{1}{N} \sum_{m=1}^{N} |\hat{r}_{yy}^{(m)}(\tau)|^2 \qquad (2)$$

where "N" is the number of windows used to estimate the second order moment.

This fluctuation ($\rho(\tau)$) therefore represents the rate of change in the autocorrelation function. When the delay constant ($\tau$) is set to the "proper" value corresponding to the code length of the spreading code used in the transmissions from target 105, the autocorrelation will reflect a relatively high rate of change. This rate can be compared to an appropriate threshold value 304 to identify the presence of spread spectrum components in the received signal. Threshold value 304 can be empirically determined, or can be based upon expected values for received signals. In an exemplary embodiment, threshold 304 may be set to a level approximately three to four standard deviations from the mean fluctuation 302 experienced when only noise is present in the received signal. When the fluctuation 302 exceeds the threshold, it can be readily ascertained that repeating codes are present within the received signals. These fluctuations may be determined across any number of different delay values ($\tau$) until proper delay values for the implementation are identified.

FIG. 4 shows several scenarios (a)-(e) for detecting the presence or absence of target 105 within a target cell 120. In scenario (a), a single target 105 is present within the target cell 120. In this case, both beams 110 and 112 should determine that a single target 105 is present, thereby resulting in a correct identification of target 105 within target cell 120. Scenario (b) similarly shows a case wherein no targets 105 are present, so both beams 110 and 112 should recognize that no target 105 is located within target cell 120, another correct result.

In scenario (c), multiple targets 105A-B are present within beam 110, and a single target 105C is present within beam 112. No targets 105 are present in target cell 120, however. In some embodiments, this condition could produce a "false positive" condition wherein both beams 110, 112 indicate the presence of a target 105, yet no target 105 is located in the target cell 120. To remedy this situation, it may be desirable in some embodiments to compare at least portions of received signals 110, 112 with each other, to ensure that the targets 105 recognized by both beams 110, 112 are generating the same signals.

In signal (d), a single target 105 is present in beam 112, but not in beam 110. This should be correctly identified as no target 105 present in target cell 120. Scenario (e) similarly shows two targets 105A-B in beam 110 but no target in beam 112. This should also correctly return the result that no target 105 is present in target cell 120.

Note that scenarios (c) and (e) show multiple targets 105A-B located within beam 110. This co-channel interference could be detected in some embodiments using any number of techniques. In some embodiments, co-channel interference could be identified through slight but detectable variations in timing or other factors between signals received from the two targets 105A-B. In other embodiments, co-channel interference could be identified by attempting to at least partially demodulate the received signal. Even though the spreading codes may not be known, the phase shift keying (or bi- or quad-phase shift keying) or other modulation scheme associated with the CDMA or other network may be known. If the received signal can be partially demodulated, it is most likely emanating from a single source. If complications arise in demodulation, these complications could be due to co-channel interference. Hence, if the received signal cannot be conveniently demodulated using BPSK or other parameters, then co-channel interference may be identified in some embodiments. In still other embodiments, received signals may be correlated between multiple receptors (e.g., at different intercept sites) to further identify commonality in the received signal, as described above.

Equivalent embodiments may use other detection and signal processing techniques other than the techniques discussed above. The signal data obtained from each intercept cite 106, 108 may be individually or collectively analyzed in any manner to identify any amount of information received from directional beams 110, 112.

Various systems and techniques for detecting spread spectrum transmissions within an area of interest are therefore described. As noted at the outset, these techniques and systems may be applied in any military, law enforcement, homeland security, public safety, industrial, commercial, medical, personal or any other setting to detect the presence and/or location of CDMA, DSSS and/or other signals as desired.

As used herein, the word "exemplary" means "serving as an example, instance, or illustration". "Exemplary" embodiments are not intended as models to be literally duplicated, but rather as examples that provide instances of embodiments that may be modified or altered in any way to create other embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. A system of detecting a target transmitter located within an area of interest and transmitting a spread spectrum signal having an unknown spreading code, the system comprising:
   a first intercept receiver configured to provide a first directional receiving beam that is directionally oriented toward a selected portion of the area of interest;
   a second intercept receiver configured to provide a second directional receiving beam directionally oriented toward the selected portion of the area of interest; and
   a central control configured to direct the first and second intercept receivers to thereby coordinate the simultaneous orientation of the first and second directional receiving beams toward the selected portion of the area of interest, and to indicate that a target transmitter is located in the selected portion of the area of interest if the first and the second directional receiving beams both indicate the presence of the spread spectrum signal, the location of the target transmitter being within an intersection of the first and second directional receiving beams,
   wherein when neither the first nor the second receiving beams indicate the presence of a same spread spectrum signal of the central controller is configured to indicate the absence of a target transmitter at the intersection point of the first and second directional receiving beams;
   wherein the presence of the spread spectrum signal within the first and second receiving directional beams is determined by comparing second-order variations in autocorrelation functions associated with the first and second directional receiving beams to a threshold value.

2. The system of claim 1 wherein the first and the second intercept receivers are located at first and second locations within the area of interest, and wherein the first and second locations are different from each other.

3. The system of claim 1 wherein at least one of the first and second intercept receivers are mobile receivers.

4. The system of claim 1 wherein the central control is further configured to compare the signal received from the first directional receiving beam with the signal received from the second directional receiving beam to confirm commonality of the spread spectrum signal.

5. The system of claim 1 wherein the first and second intercept receivers are each configured to identify the presence of the spread spectrum signal within the first and second directional receiving beams, respectively.

6. The system of claim 1 wherein the first and second intercept receivers are each configured to provide signals received from the first and second directional receiving beams, respectively, to the central control to thereby allow the central control to identify the presence of the spread spectrum signal in the first and second directional receiving beams.

7. The system of claim 1 wherein the central control is further configured to direct the sequential orientation of the first and second directional receiving beams toward each of a plurality of cells located within the area of interest to determine a presence or absence of a target transmitter within an intersection of the beams.

8. The system of claim 1 wherein the presence of the spread spectrum signal within the first and second directional receiving beams is detected without using a spreading code associated with the spread spectrum signal, and
   wherein the location of the target transmitter is determined without using time-difference of arrival technique.

9. A system for detecting a target transmitter located within an area of interest and transmitting a spread-spectrum signal having an unknown spreading code, the system comprising:
- a first receiver for sequentially directing a first directional receiving beam from a first intercept site at a first location toward each of a plurality of cells located within the area of interest;
- a second receiver for simultaneously directing a second directional receiving beam from a second intercept site toward each of the plurality of cells such that the first and second directional receiving beams are simultaneously directed toward the same cells, wherein the second intercept site is located at a second location different from the first location; and
- a controller for determining if the spread-spectrum signal is present in each of the first and the second directional receiving beams, and for indicating that the target transmitter is located within the one of the plurality of cells if the spread-spectrum signal is present in both of the first and the second directional receiving beams, the location of the target transmitter being within an intersection of the first and second directional receiving beams,
- wherein when neither the first nor the second receiving beams indicate the presence of a same spread spectrum signal, the central controller is configured to indicate the absence of a target transmitter at the intersection point of the first and second directional receiving beams;
- wherein tile presence of the spread spectrum signal within the first and second receiving directional beams is determined by comparing second-order variations in autocorrelation functions associated with the first and second directional receiving beams to a threshold value.

10. A method for detecting a target transmitter located within an area of interest and transmitting a spread-spectrum signal having an unknown spreading code, the method comprising, for each of a plurality of cells in the area of interest:
- directing a first directional receiving beam from a first intercept site located at a first location toward one of the plurality of cells;
- simultaneously directing a second directional receiving beam from a second intercept site toward the same one of the plurality of cells, wherein the second intercept site is located at a second location different from the first location;
- determining if the spread-spectrum signal is present in each of the first and the second directional receiving beams;
- if the spread-spectrum signal is present in both of the first and the second directional receiving beams, indicating that the target transmitter is located within the one of the plurality of cells located at an intersection of the first and second directional receiving beams; and
- when neither the first nor the second receiving beams indicate a presence of a same spread spectrum signal, indicating the absence of a target transmitter within one of the plurality of cells located at the intersection point of the first and second directional receiving beams;
- wherein the determining comprises analyzing second-order variations in the autocorrelation functions of the first and second directional receiving beams.

11. The method of claim 10 further comprising determining whether a false positive condition has occurred if the spread-spectrum signal is present in both the first and the second directional receiving beams.

12. The method of claim 11 wherein the false positive condition is determined by comparing signals received by the first and the second directional receiving beams.

13. The method of claim 10 wherein the determining comprises analyzing second-order variations in the first and second directional receiving beams.

14. The method of claim 10 wherein the determining further comprises comparing second-order variations in autocorrelation functions of the first and second directional receiving beams to a threshold value.

15. The method of claim 10 wherein the determining comprises analyzing second-order variations in the autocorrelation functions of the first and second directional receiving beams for each of a plurality of correlation delay values.

16. The method of claim 10 further comprising identifying co-channel interference within the first and second directional receiving beams.

17. The method of claim 10 further comprising identifying co-channel interference within the first and second directional receiving beams by identifying variances between multiple signals received in at least one of the first and second receiving beams.

18. The method of claim 10 further comprising attempting to at least partially demodulate a signal received on at least one of the first and second directional receiving beams, and, if the at least partial demodulation of the received signal is not successful, identifying co-channel interference.

* * * * *

UNITED STATES PATENT AND TRADEMARK OFFICE
CERTIFICATE OF CORRECTION

| | |
|---|---|
| PATENT NO. | : 8,345,597 B2 |
| APPLICATION NO. | : 12/510086 |
| DATED | : January 1, 2013 |
| INVENTOR(S) | : Richard A. Poisel |

It is certified that error appears in the above-identified patent and that said Letters Patent is hereby corrected as shown below:

On the title page, in column 1, item 56, under "Other Publications", line 1, delete "A." and insert --A.,--, therefor On the title page, in column 1, item 56, under "Other Publications", line 4, delete "al." and insert --al.,--, therefor On the title page, in column 2, item 56, under "Other Publications", line 1, delete "al." and insert --al.,--, therefor On the title page, in column 2, item 56, under "Other Publications", line 4, delete "al." and insert --al.,--, therefor On the title page, in column 2, item 56, under "Other Publications", line 7, delete "al." and insert --al.,--, therefor On the title page, in column 2, item 56, under "Other Publications", line 10, delete "al." and insert --al.,--, therefor On the title page, in column 2, item 56, under "Other Publications", line 13, after "Communications", insert --,--, therefor On the title page, in column 2, item 56, under "Other Publications", line 16, after "Communications", insert --,--, therefor On the title page, in column 2, item 56, under "Other Publications", line 19, delete "al." and insert --al.,--, therefor In the drawings, Sheet 1 of 4, Fig. 1, reference numeral 116, line 1, delete "PROCESS" and insert --PROCESSOR--, therefor Signed and Sealed this
Tenth Day of December, 2013

Margaret A. Focarino
*Commissioner for Patents of the United States Patent and Trademark Office*

CERTIFICATE OF CORRECTION (continued)
U.S. Pat. No. 8,345,597 B2

In the Specification

In column 6, line 25, before "periodic", delete "at any", therefor

In column 6, line 38, delete "cites" and insert --sites--, therefor

In column 9, line 12, delete "signal" and insert --scenario--, therefor

In column 9, line 42, delete "cite" and insert --sites--, therefor

In the Claims

In column 11, line 28, in Claim 9, delete "tile" and insert --the--, therefor